Patented Sept. 26, 1944

2,359,119

UNITED STATES PATENT OFFICE 2,359,119

ALKYLATION PROCESS

Horace M. Karr, Rodeo, Calif., and Carl MacHenry, Houston, Tex., assignors to Shell Development Company, San Francisco, Calif., a corporation of Delaware No Drawing. Application November 14, 1941, Serial No. 419,120

7 Claims. (Cl. 260—683.4)

This invention relates to the production of normally liquid hydrocarbons by reacting saturated aliphatic hydrocarbons having a tertiary carbon atom with alkylating agents. It deals particularly with an improved method of carrying out reactions of this type in the liquid phase in the presence of concentrated sulfuric acid catalysts.

The alkylation of isoparaffins with olefines in the presence of sulfuric acid is carried out on a large scale, particularly for the production of motor fuel components. In spite of extensive research the maximum quality of alkylation product has not been obtained heretofore. It is an important object of the present invention to improve alkylation processes of this type and, more specifically, to provide a new method of alkylating isoparaffins and the like in the presence of sulfuric acid whereby the yield of high quality products may be increased. It is also an object of the invention to increase the effective life of the sulfuric acid in the process. Still further objects and advantages of the invention will be apparent from the following description.

For the purpose of making the invention more clear it will be described with particular reference to the alkylation of isobutane with normally gaseous olefines, especially the butylenes. It will be understood, however, that the invention is not limited to this application but may be advantageously applied not only to the alkylation of other saturated hydrocarbons having a tertiary carbon atom which may be of either open or closed chain structure, but also that other alkylating agents, whether olefinic or not, may be used. Thus, for example, isopentane, isohexane, 2,2,5-trimethyl hexane, methyl cyclohexane, methyl cyclopentane, para dimethyl cyclohexane, and the like may be alkylated either singly or in admixture with or without other compounds which may be inert under the reaction conditions or which may undergo simultaneous alkylation or other reaction without interfering with the process. Typical of the olefines which may thus be used are, for example, ethylene, propylene, alpha and beta butylenes, isobutylene, the amylenes, cyclopentene, cyclohexene, methyl cyclohepene and higher olefines or mixtures thereof such as fractions of cracking gases or of cracked or reformed gasoline and the like. Instead of the olefines themselves, polymers thereof as, for example, diisobutylene or interpolymers of tertiary olefines with other less reactive olefines such as are described in United States Patent 2,174,247, or esters, either organic or inorganic, corresponding to such olefines or polymers may be used. Inorganic or organic esters of primary alcohols such as methyl, ethyl, propyl, butyl, isobutyl and like alcohols may be employed as alkylating agents instead of the secondary and tertiary esters corresponding to the olefines. The process is also advantageous when ethers or alcohols are used as the alkylating agent. It may likewise be used when aralkylating agents such as, for example, benzyl alcohol, cinnamyl alcohol, and the like or substituted alkylating agents are employed, and the expression "alkylating agent" will therefore be understood as referring generically to any compound capable of introducing an alkyl group, which may or may not contain one or more substituent elements or groups, into a saturated aliphatic hydrocarbon having a tertiary carbon atom.

In the commercially successful processes for alkylating isoparaffins with olefines in the presence of sulfuric acid, the catalyst acid and reactants are emulsified under suitable reaction conditions, the most important of which are that a large excess of isoparaffin to olefine is present in the reaction and that a relatively low temperature of the order of about 0° C. to about 30° C., preferably about 5° C. to 15° C. in alkylating isobutane with a butylene, is maintained. In continuous methods of operation a part of the emulsion is diverted continuously to a separator in which the phases are separated. Alkylation products are recovered from the separated hydrocarbon phase and the acid phase is returned to the reaction. A part of the separated acid phase is replaced, batchwise or continuously, by sufficient fresh acid to maintain the catalytic activity of the acid at a suitably effective level. Preferred methods of carrying out alkylations of this type are described in United States Patents 2,211,747 and 2,232,674, for example.

Undesirable side reactions which reduce the yield and quality of the product and shorten the life of the catalyst may take place in the process. These side reactions are thought to be due, at least in part, to the polymerization which takes place when the concentration of alkyl sulfates formed by reaction of the olefine with the acid catalyst is allowed to become too high and to hydropolymerization reactions which take place when such alkyl sulfates or polymers are permitted to react in the absence of sufficient isobutane or the like. Whether or not this is a true and complete explanation of the side reactions which take place in the usual isoparaffin alkylation processes, it has been found that improved results may be obtained by so operating as to maintain the acid sufficiently saturated with isobutane throughout the reaction and thus inhibit undesirable reactions of this type.

It has already been proposed to carry out the alkylation of isobutane using a high molar ratio, preferably at least 50:1 and advantageously 100:1 or higher, of isobutane to olefine at the point where the olefine initially contacts the acid. This is particularly desirable because at the point where the olefine first contacts the concentrated sulfuric acid side reactions due to highly reactive, freshly formed alkyl sulfates may very readily occur. The mere provision of a large amount of isobutane at the feed inlet of olefine is not sufficient to entirely suppress the reactions which reduce the yield of high quality products and shorten the life of the catalyst. It is necessary that the isobutane be present in sufficient amount where the alkyl sulfate is undergoing reaction, that is, presumably, at the interface of the acid and hydrocarbon phases present in the reaction mixture. This involves accurate control of the emulsion itself.

The emulsions of sulfuric acid and isobutane-containing hydrocarbon formed under alkylation conditions are quite different from the usual emulsions of immiscible liquids. As a general rule, when a liquid is added, with suitable mixing, in relatively small increments to a larger volume of another liquid with which it is incompletely miscible, the added liquid is at first dispersed in a continuous phase of the larger volume of liquid but as the volume of added liquid is increased a point is finally reached at which phase inversion takes place and the previously dispersed liquid becomes the continuous phase. The inversion point depends upon the surface-active properties of the liquids involved and the liquid forming the continuous phase of the emulsion need not be, and frequently is not, the one which is present in greatest volume. It has been found, however, that no true inversion takes place as the proportion of hydrocarbon is increased in alkylation emulsions. Instead of a dispersion of acid in hydrocarbon being formed when the amount of hydrocarbon exceeds that which the acid can emulsify under given conditions, the hydrocarbon-in-acid emulsion continues to persist and the excess hydrocarbon does not apparently emulsify. The amount of hydrocarbon dispersed in the acid in any given case represents a balance between the viscosity of the emulsion and the efficiency of the emulsification process. In order to maintain the acid as completely saturated with isobutane as possible, particularly at the interface, it is therefore desirable usually to employ the most efficient emulsification practicable and to operate with highly viscous emulsions. However, the use of such emulsions not only increases the power requirements of the process but also highly viscous emulsions containing large amounts of hydrocarbon are difficult to separate and require undesirably long times of residence in the separator. Up until reaching the separator the emulsion is maintained under good alkylating conditions, particularly intimate contact of isoparaffin with the acid. In the separator everything is done to remove hydrocarbons, including the isoparaffin being alkylated, from the acid. Where slowly separating emulsions are used the acid may be kept in the separator for relatively long periods out of intimate contact with the isoparaffin, thus favoring the side reactions which contribute to the deterioration of the acid and lower yields of desirable products. It is therefore advantageous to maintain the viscosity of the emulsified alkylation reaction mixture within an intermediate range in which an adequate amount of isobutane is maintained in emulsified contact with the acid, yet sufficiently rapid phase separation may be achieved so that undesirable side reactions are reduced.

The phase relations existing in the emulsion, the degree of emulsification and the uniformity of the emulsion are not the only factors which influence the viscosity of the reaction mixture since this is effected also by, for example, the temperature of operation, the nature and amount of hydrocarbons, particularly olefine, dissolved in the acid instead of emulsified, the type of power input, etc. Thus, control of the viscosity of alkylation reaction mixtures provides a means of regulating a complex combination of variables, some of which are perhaps still unknown, so as to maintain optimum conditions of reaction.

It has been found that the best results are obtained in alkylating isoparaffins in the presence of concentrated sulfuric acid by maintaining the viscosity of the emulsified reactants and catalyst within the limits of 0.40 and 1.05 poises and most preferably between 0.65 and 0.95 poise. It is preferred to carry out the reaction under conditions at which the catalyst acid constitutes the continuous phase of the emulsion and the hydrocarbon is uniformly distributed therethrough. To this end it is advantageous to maintain a volume ratio of acid to hydrocarbon in the liquid mixture of about 0.85:1 to about 2.5:1, preferably 0.9:1 to 1.5:1.

The viscosity of the reaction mixture may be measured in different ways. It is desirable that the determination be carried out under pressure when volatile components are present and, since the emulsions involved are unstable, that the measurement be made under conditions of agitation preferably analogous to those existing during reaction. It is also advantageous to test the sample as soon as possible after withdrawal from the reactor and to employ a sample of sufficient size to represent an accurate cross-section of the emulsion existing in the system.

As a further aid to maintaining the catalyst acid thoroughly saturated with isobutane at the interface of the emulsified phases, it is preferred to operate with a high concentration of isobutane in the emulsified hydrocarbon. Concentrations of isobutane or any other isoparaffin being alkylated are preferably maintained above about 60% by volume in the hydrocarbon phase of the reaction mixture. This may most conveniently be achieved by using as feed hydrocarbon containing not more than 40% and preferably not more than 20% by weight of diluents and having a molar ratio of isobutane to olefine of at least 3:1 and more preferably 5 to 10:1 or higher. It is also desirable to allow ample time for substantial completion of the reaction before withdrawing emulsion to the separator for recovery of product. An average time of contact of about 20 to 60 minutes is usually sufficient.

The advantages of operating according to the invention are shown by the following results obtained in alkylating isobutane with normal butylenes, mainly beta butylene, in a plant arranged for continuously feeding these hydrocarbons together with normal butane into a stream of emulsified reaction mixture circulating in a closed circuit through a cooler and time tank. Reacted mixture was continuously withdrawn to a separator in which the emulsion was allowed to stratify. The separated hydrocarbon phase was caustic treated and distilled to recover alkylate from the excess isobutane and unreacted normal butane. The recovered alkylate was refractionated to separate the products boiling in the gasoline range. The reaction conditions maintained during the test run were:

| | |
|---|---|
| Isobutane to olefine ratio in the feed (mols) | 21:1 |
| Mol percent isobutane in the feed | 82.1 |
| Volumes of emulsified hydrocarbon recycled to mix with one volume of feed | 200 |
| Volumes of acid per volume of hydrocarbon in the reactor | 1.5 |
| Viscosity of emulsified reaction mixture (poises) | 0.75 |
| Fresh acid concentration (weight percent $H_2SO_4$) | 99.6 |
| Pressure (pounds per square inch gauge) | 60 |
| Reactor temperature °C | 5 |
| Average residence time of hydrocarbon in the reactor (minutes) | 50 |

Operating thus with the viscosity of the reaction mixture maintained at about 0.75 throughout the test period gave a product which contained 97.2 of hydrocarbons boiling between 23° C. and 150° C. and having an octane number of 96.7, and 91.9% boiling between 95° C. and 130° C. and having an octane number of 97.0. This shows that by this method of operation almost the entire product is high quality primary alkylation product and that side reactions have been substantially suppressed. By way of comparison ordinary plant operation with the same reactants gives at best only about 89% of products boiling between 23° C. and 150° C. and these have an average octane number of about 93, and only about 81% of alkylate boiling between 95 C. and 130° C. Furthermore, by maintaining the viscosity of the reaction emulsion within the range of about 0.65 to 1.02 an acid life of about 40–42 volumes of alkylate per volume of acid has been obtained. This corresponds to an increase of about 50% over the acid life obtained in normal plant scale operations.

Analogous advantages may be obtained in applying the invention to the reaction of isoparaffins with other alkylating agents in the presence of sulfuric acid catalysts by suitably modifying the reaction conditions in accordance with the characteristics of the alkylating agent chosen. Thus, for example, in alkylation processes involving absorption of one or more olefines from a fraction of cracking products in sulfuric acid and reacting the resulting absorption product, after separation of unabsorbed starting material, with isobutane as described and claimed in copending application, Serial No. 305,498, filed November 21, 1939, it is preferred to carry out the alkylation with an emulsion having a viscosity lower than that recommended for alkylation with the corresponding olefine, all other conditions being the same. Likewise, the process of the invention may be used not only when sulfuric acid is used alone as the catalyst but also with sulfuric acid containing suitable modifying agents. Thus, sulfuric acid, admixed with other acids as for example hydrogen fluoride, phosphoric acid and the like or with other compounds such as boron fluoride, or sulfur trioxide, or nickel sulfate, etc., may be used as catalyst, due allowance being made for the effect of these added components on the viscosity of the emulsion.

While the invention has been described with especial reference to the improvement of the preferred alkylation procedures involving continuous circulation of an emulsion of the catalyst acid and reactants through a closed circuit comprising a time tank and cooler under alkylation conditions and continuous diversion of a part of the emulsion to a separator in which hydrocarbon phase containing the product is separated from acid which is returned to the reaction, it is also applicable to other methods of carrying out the reaction. Thus, for example, it may be applied with advantage when the circulation of the emulsion is in a unitary reactor or when the entire emulsion is separated after reaction, as when the reactants and acid are mixed and passed through a suitable coil, tower or baffle tank or the like providing adequate time for reaction into a separator. Still other variations in the application of the invention may be made. It will therefore be understood that the invention is not limited to the details of operation described by way of illustration nor by any theory suggested in explanation of the improved results obtained.

We claim as our invention:

1. In a process of alkylating isobutane wherein isobutane and a butylene in the liquid phase are continuously fed into an emulsion of concentrated sulfuric acid and hydrocarbon under alkylating conditions, the improvement which comprises maintaining the volume ratio of acid to hydrocarbon in said emulsion between about 0.9:1 and about 1.5:1 and the viscosity of the emulsion within the limits of 0.65 to 0.95 poise and maintaining the proportion of isobutane at least 60% by volume in the hydrocarbon phase and the molar ratio of isobutane to olefine in the feed at least three.

2. In a process of alkylating isobutane by reaction with a butylene in the presence of concentrated sulfuric acid while flowing in a closed circuit under alkylating conditions, the improvement which comprises maintaining in said circuit an emulsion of 0.9 to 1.5 volumes of said acid per volume of hydrocarbon and having a viscosity of 0.65 to 0.95 poise at 5° C. to 15° C. and simultaneously maintaining a concentration of isobutane in the hydrocarbon phase of said emulsion of at least 60% by volume.

3. In a process of alkylating isobutane by reaction with an olefine in an emulsion of concentrated sulfuric acid and hydrocarbon under alkylating conditions, the improvement which comprises maintaining in said emulsion 0.85 to 2.5 volumes of acid per volume of hydrocarbon and controlling the emulsification so as to maintain the viscosity of the emulsion within the limits of 0.45 and 1.05 poises.

4. In a process of alkylating isobutane by reaction with an olefine in the presence of concentrated sulfuric acid, the improvement which comprises effecting said reaction in a substantially uniform emulsion of hydrocarbon and said acid having a viscosity of 0.45 to 1.05 poises at 5° C. to 15° C.

5. In a process of alkylating an isoparaffin by reaction with an olefine in the presence of concentrated sulfuric acid wherein a molecular excess of said isoparaffin to said olefine is fed into an emulsion of said acid and hydrocarbon maintained under alkylating conditions, the improvement which comprises maintaining a continuous phase of said acid throughout the reaction mixture and simultaneously maintaining the viscosity of the emulsion within the limits of 0.45 and 1.05 poises.

6. In a process of alkylating an isoparaffin by reaction with an alkylating agent in the presence of a sulfuric acid catalyst, the improvement which comprises forming an emulsion of said reactants and catalyst having a viscosity of 0.45 to 1.05 poises under alkylating conditions.

7. In a process of alkylating a saturated aliphatic hydrocarbon having a tertiary carbon atom by reaction with an alkylating agent in an emulsion of hydrocarbon and a sulfuric acid alkylation catalyst under alkylating conditions, the improvement which comprises maintaining the viscosity of said emulsion within the limits of 0.45 to 1.05 poises during said reaction.

HORACE M. KARR.
CARL MacHENRY.